(12) United States Patent
Lundström et al.

(10) Patent No.: US 11,486,047 B2
(45) Date of Patent: Nov. 1, 2022

(54) METHOD OF RECOVERING PT OR AG OR PT AND AG FROM SULFATE BASED METAL SOLUTIONS

(71) Applicant: Aalto University Foundation sr, Aalto (FI)

(72) Inventors: Mari Lundström, Aalto (FI); Kirsi Yliniemi, Aalto (FI); Petteri Halli, Aalto (FI); Samuli Franssila, Aalto (FI); Ville Jokinen, Aalto (FI); Joonas Heikkinen, Aalto (FI)

(73) Assignee: Aalto University Foundation sr, Aalto (FI)

( * ) Notice: Subject to any disclaimer, the term of this patent is extended or adjusted under 35 U.S.C. 154(b) by 291 days.

(21) Appl. No.: 16/624,993

(22) PCT Filed: Jun. 20, 2018

(86) PCT No.: PCT/FI2018/050484
§ 371 (c)(1),
(2) Date: Dec. 20, 2019

(87) PCT Pub. No.: WO2018/234637
PCT Pub. Date: Dec. 27, 2018

(65) Prior Publication Data
US 2020/0141016 A1    May 7, 2020

(30) Foreign Application Priority Data
Jun. 22, 2017   (FI) ..................................... 20175591

(51) Int. Cl.
C25C 5/02    (2006.01)
C25C 1/20    (2006.01)
(Continued)

(52) U.S. Cl.
CPC .............. *C25C 1/20* (2013.01); *C22B 11/042* (2013.01); *C25C 7/02* (2013.01)

(58) Field of Classification Search
CPC .... C25C 7/00; C25C 1/00; C25C 7/02; C25C 7/06; C25C 5/02
See application file for complete search history.

(56) References Cited

U.S. PATENT DOCUMENTS

| 4,303,441 A | 12/1981 | Lamisse |
| 2011/0052671 A1 | 3/2011 | Zasadzinski et al. |
| 2014/0076618 A1 | 3/2014 | Cho et al. |

OTHER PUBLICATIONS

Brankovic et al: Metal monolayer deposition by replacement of metal adlayers on electrode surfaces. Surface Science, 2001, vol. 474, p. L173.

(Continued)

*Primary Examiner* — Zulmariam Mendez
(74) *Attorney, Agent, or Firm* — Laine IP Oy (57) ABSTRACT

The invention relates to a method of recovering Pt or Ag or Pt and Ag from a sulfate solution on an electrode. In particular, the invention concerns a method for recovering Pt or Ag or Pt and Ag from base metal bearing process solution, particularly from a hydrometallurgical sacrificial metal bearing solution containing Zn and/or Ni. In general, the method of the present invention can be used for recovery of precious metals, which are dissolvable in sulfuric acid, from sulfate media based solutions. In addition to Pt and Ag, especially Pd should be mentioned.
Deposited precious metal(s) can be recovered from the electrode or the deposition containing electrode can be used as such.

21 Claims, 3 Drawing Sheets

(51) Int. Cl.
   *C22B 11/00*      (2006.01)
   *C25C 7/02*       (2006.01)

(56)            References Cited

OTHER PUBLICATIONS

Dimitrov: Recent Advances in the Growth of Metals, Alloys, and Multilayers by Surface Limited Redox Replacement (SLRR) Based Approaches. Eletrochimica Acta, 2016, vol. 209, pp. 599-622.
Maijenburg et al: Electrodeposition of micropatterned Ni|Pt multilayers and segmented Ni|Pt|Ni nanowires. Electrochimica Acta, 2012, vol. 81, pp. 123-128.
Papadimitriou et al. Methanol Oxidation at Pt—Cu, Pt—Ni, and Pt—Co Electrode Coatings Prepared by a Galvanic Replacement Process. Journal of Physical Chemistry C, 2010, vol. 114, pp. 5217-5223.
Papadimitriou et al: Preparation and characterisation of platinum- and gold-coated copper, iron, cobalt and nickel deposits on glassy carbon substrates. Electrochimica Acta, Sep. 20, 2008, vol. 53, No. 22, pp. 6559-6567.
Rettew et al. Layer-by-Layer Pt Growth on Polycrystalline Au: Surface-Limited Redox Replacement of Overpotentially Deposited Ni Mololayers. Journal of the Electrochemical Society, 2009, vol. 156, pp. D513-D516.
Rettew et al: Synthesis and Characterization of Monolayer Bimetallic Surfaces: A Synchrotron NEXAFS and XPS Study. ECS Transactions, 2009, vol. 19, pp. 97-106.
Tegou et al. A rotating disc electrode study of oxygen reduction at platinised nickel and cobalt coatings. Journal of Solid State Electrochemistry 2010, vol. 14, pp. 175-184.
Tegou et al. Mixed platinum-gold electrocatalysts for borohydride oxidation prepared by the galvanic replacement of nickel deposits. Journal of Electroanalytical Chemistry, 2009, vol. 634, pp. 104-110.

METHOD OF RECOVERING PT OR AG OR PT AND AG FROM SULFATE BASED METAL SOLUTIONS

FIELD OF THE INVENTION

The invention relates to a method of recovering Pt or Ag or Pt and Ag from a sulfate solution. In particular, the invention concerns a method for recovering Pt or Ag or Pt and Ag from base metal bearing process solution, particularly from a hydrometallurgical sacrificial metal bearing solution containing Zn and/or Ni.

BACKGROUND OF THE INVENTION

Primary and secondary raw materials in base metal production, such as in Zn, Ni and Cu production are commonly processed hydrometallurgically in some stage of the process. The most common media used in processing is sulfate-based solution. Both primary and secondary raw materials contain not only base metals but also some amount of Pt and/or Ag and other elements, depending on the source. As a result, some part of these elements end up to the process solutions, even though majority of the Pt and/or Ag can be systematically removed as by-products. However, at some point of the process, the solutions or side products still contain Pt and/or Ag, but at such low concentrations, that removal of these is not considered as economically attractive.

On the other hand, there is a huge need for Pt and/or Ag in modern life applications, green energy applications and electronic devices. For example, development of effective catalysis surfaces focus on Pt or Ag replacement due to globally limited Pt and/or Ag resources. Also, development in solar energy panels aim at reducing Ag content due to the estimation that by 2050, the amount of silver utilized in photovoltaic cells is approximately 10% of the global silver reserves. However, Pt and/or Ag are in most applications showing superior properties and, thus still used. Commonly used electrochemical technologies for base metals recovery from sulfate solutions containing e.g. Zn, Ni and Cu are electrorefining and electrowinning technology. As Zn and Ni have relatively low reduction potential in electrodeposition and hydrogen evolution can occur at the same potential range as the metal deposition, the process parameters need to be carefully adjusted in order to get the base metal deposited with good quality and energy efficiency. The methods used for the adjusting of the process window and minimizing hydrogen evolution are for example additives, adjusting pH, adjusting solution concentration and temperature. Also, the electrode material affects the starting potential of the hydrogen evolution.

It is worth noting that Pt and Ag are more noble than base metals in sulfate based solutions and a majority of the Pt and/or Ag end up to the anode slime or to the Pt and/or Ag rich side-product or residue. However, minor amount of Pt and/or Ag can be present in the sulfate solution during the process. Commonly this minor amount of Pt and/or Ag in the process solutions are wasted e.g. to the cathode during electrowinning or electrorefining of base metals, to the solution purification solutions, to the liberator cells, to the liberator cell cathodes, solids or residues or other side streams and/or products.

The present invention relates to recovery of Pt or Ag or Pt and Ag by the method of electrodeposition-redox replacement (ED-RR).

The electrodeposition-redox replacement method (and related methods such as surface-limited redox replacement (SLRR) and electrodeposition-galvanic replacement) have been introduced in scientific literature earlier. Brankovic et al. (2001) have published a ground-breaking paper of surface-limited redox replacement (SLRR) where Cu was used as a sacrificial metal, and submonolayers, monolayers or bilayers of Pt, Ag and Pd were prepared. Several publications have followed this paper and for example, Pb and Tl have been used as sacrificial layers for ultrathin or monolayer growth of Ag while Cu and Pb have been used as sacrificial layers for the formation of ultra-thin Pt films (the review by Dimitrov (2016) and the references within).

In the scientific literature, nickel has also been commonly used as a sacrificial metal for the formation of Pt or PtNi films or nanoparticles, utilising redox replacement reaction between Ni and Pt, often in combination of electrodeposition (e.g. Rettew (ECST and JES at 2009), Maijenburg et al. (2012), S. Papadimitriou et al. (2010, 2008), Tegou et al. (2009, 2010), Zhang et al (2012)). Typically in these publications Ni—Pt films or nanoparticles are prepared using dilute synthetic solutions. Also, in some cases the electrodeposition and redox replacement steps are performed in separate electrolytes (electrodeposition in a nickel containing electrolyte and redox replacement in Pt containing electrolyte).

In contrast to the present invention, the main goal of scientific studies is to deposit thin and defect-free (mono) layers of metals or metal alloys, nanoparticles or nanostructures and not to recover Pt and/or Ag. Moreover, the solutions used in the scientific literature are typically dilute, synthetic solutions and not impure hydrometallurgical process solutions, while the present method aims at the recovery of Pt or Ag or Pt and Ag from hydrometallurgical process solutions, which contain large amounts of base metals and low concentrations of Pt and/or Ag.

SUMMARY OF THE INVENTION

The current invention relies on the novel use of electrodeposition-redox replacement methods for Pt or Ag or Pt and Ag recovery from hydrometallurgical sulfate solutions, typical for base metal production (such as Zn and Ni) from primary or secondary raw materials. The solution in which Pt and/or Ag is present can be the main process solution, a solution purification side stream or acid, side product or residue leaching solutions or any other sulfate media based hydrometallurgical solutions containing Pt and/or Ag with base metals such as Ni and/or Zn. The solution typically contains high concentrations of sulfates and base metals (Ni and/or Zn) and low concentrations of Pt and/or Ag. It is also typical that these solutions can contain several other elements such as Bi, Cu, Pb, Pd, Sn, Te, Se, Co, Na, Ca, Mg. Currently Pt and/or Ag are not recovered from the solutions where they exist at very low Pt and/or Ag concentrations.

More specifically, the present invention is characterized by what is stated in the characterizing parts of the independent claims.

Surprisingly, our combination provides a method to recover Pt or Ag or Pt and Ag from low concentrations, even from solutions having Pt and/or Ag as low as <1 ppm.

Furthermore, it was found out that 3D carbon provides superior electrode material qualities and the deposit on this 3D carbon could be used directly as a catalyst material for example for $H_2$ evolution.

It is also noteworthy that by using this method, no chemical addition is needed for Pt and/or Ag recovery. In addition, the method can improve the circular economy of metals, as critical metals such as Pt and Ag can be recovered from solutions in which they are present at very low concentrations in the presence of large amount of base metals and impurities and not recovered currently by state-of-art methods.

In one embodiment, a feature of the method is that a special electrode structure is combined with ED-RR recovery of Pt and/or Ag in order to improve the recovery. The special electrode structure used in the method is a 3D carbon material, which is fabricated through a pyrolysis process of polymers, primarily photoresists including SU-8. Multiscale roughness will be created by micro- and nanostructuring the polymer films prior to pyrolysis, utilizing for example lithography and embossing techniques. Alternatively, carbon (e.g. glassy carbon or nanotubes) can be machined by for example by laser; or 3D structures of other materials like silicon can be coated by a carbon. Also, 3D carbon can form spontaneously during the pyrolysis.

Other objects and features of the invention will become apparent from the following detailed description considered in conjunction with the accompanying drawings. It is to be understood, however, that the drawings are intended solely for purposes of illustration and not as a definition of the limits of the invention, for which reference should be made to the appended claims.

BRIEF DESCRIPTION OF THE DRAWINGS

Some results of the Examples are presented with reference to the attached drawings, in which.

DETAILED DESCRIPTION OF EMBODIMENTS

One aspect of the present invention is to enable the recovery of Pt and/or Ag from sulfate based solutions, typical for hydrometallurgical base metal production, where Pt and/or Ag is present at low concentrations, without any additional chemical consumption. This is done by an electrodeposition-redox replacement method (ED-RR), which preferably includes step 1 for electrodeposition and step 2 for redox replacement, and these steps can be repeated subsequently or following a multistep pattern.

In general, the method of the present invention can be used for recovery of precious metals, which are dissolvable in sulfuric acid, from sulfate media based solutions. In addition to Pt and Ag, especially Pd should be mentioned.

The term "recovery", as used in the present context, refers to a recovery of Pt and/or Ag and/or other precious metal which is dissolvable in sulfuric acid from a sulfate based process solution in a form of a deposition on the surface of an electrode.

Further, the term is also used in a connection with the recovery (i.e. removal) of the metal from the electrode. In addition, the term "recovery" should be interpreted as follows that at least some of the precious metal is being recovered.

During ED-RR method, Pt, Ag and/or Pd are enriched on the surface of an electrode.

In the present context the enrichment can be defined as a ratio of a weight-% of the recovered metal on the electrode surface compared to weight-% of it originally in the solution (wt-% of replacement metal on the surface/wt-% of replacement metal originally in the solution). According to a preferred embodiment the enrichment is at least 1 000 fold, more preferably at least 10 000 fold and even more preferably at least 500 000 fold.

In the present context, the term "sulfate based solutions" or "sulfate based media" designates aqueous solutions which contain sulfate ions. Thus, for example, the terms "sulfate based solutions" or "sulfate based media" stand for solutions of sulfuric acid or obtained from sulfuric acid (which may also be referred to as "spent" acid solutions). Sulfate can also originate from the raw material containing sulfur. Typically, the terms stand for solutions of sulfuric acid used for leaching or otherwise for dissolving metals from raw materials. The "sulfate based solutions" or "sulfate based media" is in particular derived from hydrometallurgical base metal production or hydrometallurgical treatment of secondary raw materials.

In the present context, "3D", when used in relation to electrodes, designates a conductive material having a non-planar geometry with increased surface area in the micro/nanoscale, being higher than the projected geometrical surface area. Micro- and nanostructuring of the electrode, or stacking of multiple electrodes, is used to increase electrode area and thus, 3D carbon is any carbon material which utilizes micro and nanoscale structures or pores (either fabricated as such or those that form automatically during processing) or their combinations to increase the effective surface area of the carbon electrode.

An object of the present invention is to provide a method of recovering of Pt and/or Ag from a sulfate based solution containing Zn and/or Ni, such as process solutions from hydrometallurgical plant. Typically, the solution originates form leaching plant for ores or concentrates, Zn electrowinning plant, nickel sulfuric acid leaching plant, electrowinning or electrorefining process, solution purification process, slime treatment process or side-stream treatment process. The sulfate process solution can also originate from leaching of secondary raw materials.

In one embodiment, the present method is used for recovering Pt or Ag or Pt and Ag from sulfate based process solution rich in sacrificial metal, such as Ni and/or Zn comprising:

a) step 1: electrodeposition of sacrificial metal such as Zn and/or Ni by applying an external potential or current or pulse potential or pulse current to an electrode placed in a sulfate based process solution;

b) step 2: a redox replacement of sacrificial metals by the replacement metals, such as Pt or Ag or Pt and Ag, by cutting off the applied external potential or current used in step 1. Pt or Ag or Pt and Ag present in the solution spontaneously replaces sacrificial metals such as Ni and/or Zn deposited in step 1, resulting in enrichment of Pt or Ag or Pt and Ag on the electrode;

c) optionally repeating steps a) and b) subsequently or by a multistep pattern; and d) recovering Pt or Ag or Pt and Ag from the electrode.

In a preferred embodiment of the invention, cycling between the electrodeposition step 1 and the redox replacement step 2 takes place. The number of cycles between the ED and RR steps can be varied. Alternatively, multistep pattern can be used instead of simple cycling. After the appropriate number of repetitions of step 1 and step 2, the product rich in Pt and/or Ag is achieved.

Typically, in the present method the Pt and/or Ag enrichment takes place on 3D carbon material, but also such other conductive or semi-conductive electrode materials can be used that do not prevent sacrificial metal deposition such as Ni and/or Zn deposition during step 1. The electrode(s) are made of any conductive or semi-conductive material to which sacrificial metal can be deposited on.

In a preferred embodiment of the invention, high surface area 3D carbon is used as the electrode on which the metals are deposited or enriched.

In a preferred embodiment, 3D carbon materials are manufactured through pyrolysis of polymers, primarily photoresists including SU-8. Photoresists of the SU-8 type are epoxy-based negative photoresists. Multiscale roughness can be created by micro- and nanostructuring the polymer films prior to pyrolysis, utilizing for example lithography and embossing techniques. Alternatively, carbon (e.g. glassy carbon or nanotubes) can be machined by, for example, laser; or 3D structures of other materials, like silicon, can be coated by a carbon. Typically at low potentials $H_2$ evolution can compete with sacrificial metal deposition such as Ni and/or Zn deposition. This can limit the use or feasibility of the method. For this reason 3D carbon electrode is preferred as it widens the electrochemical window and decreases the tendency of $H_2$ disturbance.

The electrode(s) can have any suitable shape, such as plate, ring, sheet, mesh, stick or any other applicable form, present in any configuration related to number of electrodes.

Surprisingly, it was found out that high surface area 3D carbon allows good adhesion and good recovery for Pt and Ag in hydrometallurgical sulfate solution (cf. Examples 2 and 4). Example 2 shows that Pt/Ni rich deposit were recovered from a solution with 60 g/L Ni and 20 ppm Pt (10 g/L $H_2SO_4$). The Pt/Ni ratio in deposit was approx. 12 on an average. This shows that the present method can be used for recovering Pt from Ni containing sulfate based solutions, typical for hydrometallurgical nickel plants. The present method can also recover multiple valuable metals, Pt and Ag, from sulfate based solution with high Ni content. Example 4 shows that Ag and Pt can be recovered simultaneously on 3D carbon with this method. The average composition of the recovered metal (Table 2 in Example 4) shows that the quality of recovery is good, with high Pt+Ag/Ni ratio (ca. 27).

Traditionally, Pt and Ag present in hydrometallurgical sulfate based process solutions are not recovered as a Pt and/or Ag rich product, but are wasted or diluted into base metal, solutions, acids, sidestreams or products due to low concentrations of Pt and/or Ag present in the solution. The present invention outstandingly shows the possibility to recovery Pt and/or Ag from very low concentrations, even as low as 1 ppb (Example 1). Example 1 shows that Ag present at very low quantity (1 ppb, 50 ppb, 500 ppb, 1 ppm) can be recovered from Zn containing solution on Pt electrode using this method. This is a novel feature, since such low values are not typically recovered from hydrometallurgical process solutions. This finding is even more remarkable considering that the typical base metal concentration is high (in the present case Zn), typically >20 g/L.

It is also noteworthy that the replacement metal content (Pt or Ag) can be below detection limit of typical analysis methods such as AAS, ICP-OES.

Therefore, considerable advantages are achieved by the method of the present invention. The fact that Pt and/or Ag present in hydrometallurgical process solutions at low concentration (1 ppb-20 ppm) can be recovered is notable.

Also the fact that the Pt and/or Ag containing electrode, prepared using the present method, provides a catalyzing effect is notable (Example 3). Therefore, the method can be used to prepare catalytic surfaces from hydrometallurgical sulfate based solutions which have low concentrations of Pt or Ag or Pt and Ag and high concentration of base metals (such as Ni or Zn). It is remarkable, that these kind of impure hydrometallurgical process solutions with low Pt and/or Ag and high Ni and/or Zn concentration have not earlier been used for preparing catalyzing surface materials or deposits.

The recovery of Pt and/or Ag, present at levels as low as 1 ppb, from hydrometallurgical process solutions, has been challenging and economically unfeasible with current methods such as ion exchange. One advantage of the method according to the present invention is that the energy used for Zn and/or Ni deposition during electrodeposition step is utilized for spontaneous replacement reaction by Pt and/or Ag vs. base metals such as Ni and/or Zn, which can take place without external current or potential. A further advantage of the method is that no additional chemical is needed for Pt and/or Ag recovery and no additional precipitation agents such as NaHS is subjected into the process solution in this stage. Pt and/or Ag recovered by the method of the invention can be used as raw material for a precious metal plant, or further enriched by chemical or electrochemical oxidation and further recovery, or used as a catalyst surface. The obtained deposit on the electrode can be subjected to leaching, a hydrometallurgical method, a pyrometallurgical method, chemical stripping, physical stripping or electrochemical stripping for recovering Pt and/or Ag from the electrode.

In an embodiment, the present technology provides for the use of an electrodeposition-redox replacement cycling method (ED-RR) for recovery of Pt and/or Ag from sulfate based process solutions. Pt and/or Ag, are usually present at low quantities in sulfate based solution.

The method comprises of two steps: (step 1) electrodeposition of sacrificial metal such as Zn and/or Ni by applying an external potential or current or potential pulses or current pulses to an electrode placed in sulfate based process solution and (step 2) a redox replacement by the replacement metals such as Pt and/or Ag by cutting off the applied external potential or current used in step 1. In step 2 Pt and/or Ag present in solution spontaneously replaces sacrificial metals such as Ni and/or Zn deposited in step 1, resulting in enrichment of Pt and/or Ag on the electrode.

Electrodeposition step 1 is conducted at a constant current, at a constant potential, pulsing the current, pulsing the potential, or by varying the potential or current in a range in which sacrificial metal deposits on the electrode. The potential in the electrodeposition step is such that sacrificial metal can deposit on the electrode and hydrogen evolution does not prevent the metal recovery.

Redox replacement step 2 can be conducted by cutting-off the applied potential or current or reducing the current or potential to such a low value that the spontaneous replacement of sacrificial metals such as Zn and/or Ni by the replacement metals such as Pt or Ag or Pt and Ag can take place.

In the present method the recovery is typically performed by repeating step1 and step2. The electrodeposition (step 1) and redox replacement steps (step 2) are typically repeated 1-50 000 times, more typically 1-5 000 times, even more typically 10-1000 times, and still more typically 10-500 times, before recovering (removing) the replacement metals from the electrode. Not all these repetitions need to be identical, but the step 1 and step 2 parameters can be varied during the method. Also, it is possible to stop any of the steps while the step is still ongoing. The repetition of steps can also be stopped either after step 1 or step 2. It is also possible to have several step 1 before the step 2 and vice versa. The method can be finished after or during any of the steps.

In step 1, external current or potential is applied to enable the deposition for a predetermined time. Also pulsing of the current or potential during step 1 can be conducted.

According to one embodiment, during step 1, the cathodic potential is preferably less than 0 V vs. SCE (saturated calomel electrode), typically in the range from 0 or less than 0 to −2.0 V vs. SCE, more typically between 0.0 V and −1.2 V vs. SCE, and even more typically between −0.3 V and −1.2 V vs. SCE. If step 1 is performed by potential pulsing between two or more potentials, the most negative pulsing potential is less than 0 V vs. SCE (saturated calomel electrode), typically between 0 and −2.0 V vs. SCE, more typically between 0.0 V and −1.2 V vs. SCE, and even more typically between −0.3 V and −1.2 V vs. SCE. The other pulsing potentials can be any potential higher than this most negative potential.

According to another embodiment, during step 1, the cathodic potential is preferably less than 0 V vs. SCE (saturated calomel electrode), typically in the range from 0 or less than 0 to −2.0 V vs. SCE, more typically between 0.0 V and −1.0 V vs. SCE, and even more typically between −0.3 V and −0.6 V vs. SCE. If step 1 is performed by potential pulsing between two or more potentials, the most negative pulsing potential is less than 0 V vs. SCE (saturated calomel electrode), typically between 0 and −2.0 V vs. SCE, more typically between 0.0 V and −1.0 V vs. SCE, and even more typically between −0.3 V and −0.6 V vs. SCE. The other pulsing potentials can be any potential higher than this most negative potential.

If the deposition is conducted by applying external current, the absolute value of the current density is in the range of 0.01-1000 mA/cm$^2$, typically 0.01-300 mA/cm$^2$, more typically 0.01-200 mA/cm$^2$, even more typically 0.01-100 mA/cm$^2$. Step 1 has a residence time, which is in the range of 0.01 s to 10 min, more typically 0.01 s to 30 s, or even more typically 0.01 to 10 s.

In step 2 no external current or potential is applied. Optionally in step 2, current density close to corrosion current density or potential close to open circuit potential (OCP) is applied in such a way that redox replacement still can take place. Corrosion current density is the indicated current density due to the spontaneous corrosion/leaching of the electrode in the absence of external current. OCP is the electrode potential measured when no external current or potential is applied: OCP is influenced by the solution composition and activities of species present, electrode solution interface, electrode reactions, electrode material, temperature, pressure, additives and other process parameters.

Step 2 is finished after a pre-determined time or when the open circuit potential value reaches a pre-determined value, which is typically just below stripping potential of the replacement metal. This potential is below 0.6 V vs. SCE, typically below 0.4 V vs. SCE, more typically below 0.35 V vs. SCE, however at potential higher than deposition potential of sacrificial metal. The time of step 2 i.e cut-off time is such that it allows replacing the sacrificial metal such as Zn and/or Ni with the replacement metals such as Pt and/or Ag to take place, typically less than 48 hours, more typically 3 s-24 hours, even more typically 3 s-2 h, even more typically 3 s-30 min. Very low Pt and/or Ag concentrations typically demand higher step 2 time i.e. cut-off time.

The present method is typically applied to Pt and/or Ag recovery from sulfate based solution. Typically Pt and/or Ag as the replacement metals are present in solution in small quantities. The recovery takes place in sulfate based solution wherein the replacement metal (Pt and/or Ag) content is <25 ppm, typically <10 ppm, even more typically <1 ppm, even more typically <0.5 ppm. The replacement metal content (Pt and/or Ag) can be also below detection limit of typical analysis methods such AAS, ICP-OES. This is a special feature of this method—the method can be used for recovery in solution having extremely low concentrations of Pt and/or Ag. This is truly remarkable as solutions with this low concentrations of Pt and/or Ag are not typically utilized for metal recovery. Typically the sacrificial metal is Zn and/or Ni. The sacrificial metal concentration is >2 g/l, typically >5 g/l, more typically >20 g/l and even more typically >40 g/l.

Typically, the method is used in solutions in which the concentration ratio between sacrificial metal (typically Zn and/or Ni) and the replacement metal (typically Pt and/or Ag) is typically >100, more typically >1000, even more typically >10000. The method comprises or consists of the use of an electrodeposition-redox replacement method (ED-RR) for recovery of Pt or Ag or Pt and Ag from sulfate based process solutions.

Typically, sulfate based process solution rich in sacrificial base metal has sulfate content higher than 0.1 M, more typically higher than 0.3 M, even more typically higher than 0.5 M. The sulfate based process solution can also contain other elements, such as Bi, Cu, Pb, Pd, Sn, Te, Se, Co, Na, Ca, Mg, K.

As already mentioned earlier, especially Pd, of these other elements, present in the process solution at a small concentration can be recovered with the method of the present invention. Pd is metal useful in catalysts and thus, according to one embodiment can also be used to prepare catalytic surfaces according to the present method.

Recovery of Pd together with Pt and Ag is illustrated in Example 5, wherein these are enriched/recovered by ED-RR from an industrial sulfate based solution on an electrode surface.

Sulfate based process solutions typically originate from hydrometallurgical process such leaching process for ores or concentrates, electrowinning or electrorefining process, solution purification process, slime treatment process or side-stream treatment process. Sulfate based process solution can also originate from leaching of secondary raw materials.

The method of the present invention can be applied for removal, for recovery and/or both for removal and recovery Pt and/or Ag or their metal complexes or compounds from sulfate based process solution. Sulfate based process solutions in this context refer to any Zn and/or Ni and Pt and/or Ag bearing aqueous sulfate based process solution or side stream or waste solution or waste acid that originates from a hydrometallurgical process plant processing primary or secondary raw materials, more typically primary raw materials such as ores or concentrates. Typically, these solutions have a low pH, typically pH below 5.

In the sulfate based process solution, Pt and Ag are typically present in minor amounts, as soluble ions or complexes. The complexes may form with any of the solution species present in the solution or added to the solution.

The process solution can be continuously flowing, stagnant, stirred or pumped when the method is applied. The method can be applied as a continuous process or as a batch process. The method can be applied at the base metal plant, recycling plant or at accompanied plant or even at remote locations.

In order to recover Pt and/or Ag from sulfate based process solution, electrodes are immersed into the solution in a suitable vessel, pool, tank etc. or in-situ in the plant, in the accompanied plant, outlet solution etc., and repeating electrodeposition and redox replacement steps.

In one embodiment, the present method is carried out using a three-electrode set-up (working electrode (WE) =electrode at which the product is formed; counter electrode (CE) and reference electrode (RE)) or in two-electrode set-up (working electrode (WE) and counter electrode (CE)).

After performing this method, Pt and/or Ag (and other metals, such as Pd) can be recovered from the electrode by methods known by person skilled in art. The electrode obtained after step1 or after step 2, or after repeating steps 1 and 2 a number of times, is subjected to leaching, a hydrometallurgical method, a pyrometallurgical method, chemical stripping, physical stripping or electrochemical stripping for recovering Pt and/or Ag from the electrode.

According to another embodiment the electrode obtained after step 1 or after step 2, or after repeating steps 1 and 2 a number of times, can be used as such for example as a catalytic surface.

EXPERIMENTAL

Example 1. Recovery of Ag from Solutions with Minor Concentrations of Ag

Figure 1:
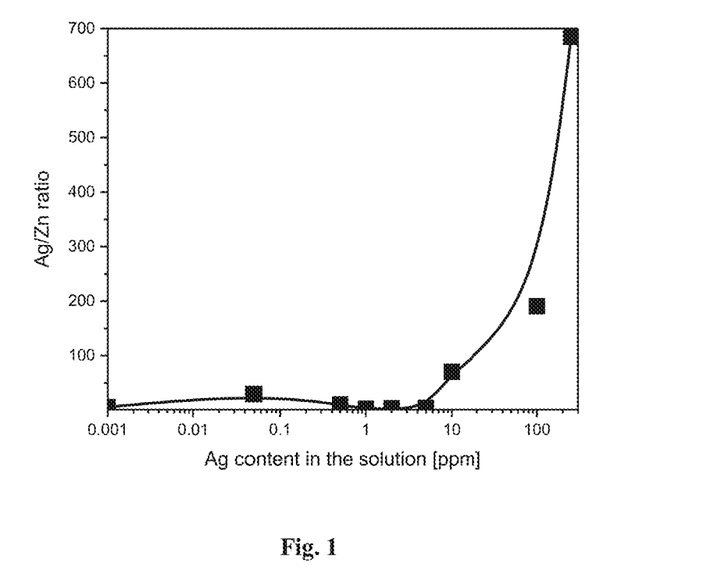
FIG. 1 illustrates that Ag can be recovered from solutions containing 1 ppb-250 ppm silver and high Zn concentration.

In this example platinum electrode was subjected to ED-RR in solution containing 60 g/L Zn, and 10 g/L $H_2SO_4$. The silver content in the solution varied between 1 ppb-250 ppm. The electrodeposition potential in step 1 was −0.7 V (vs. SCE) and the cut-off potential for the redox replacement (in step 2) was +0.3 V (vs. SCE). The used deposition time in step 1 was 10 s. The step 1 and step 2 were cycled 10 times. FIG. 1 shows that Ag can be recovered on Pt electrode with this method. The resulting deposit has over five times more Ag than Zn (in solution with 1 ppb Ag, 60 g/L Zn). The ratio between deposited Ag and Zn increases exponentially as a function of Ag content in the original solution, as seen in Table 1. This result shows that this method can be used for recovery of silver from solutions containing very low amounts of silver.

TABLE 1

Effect of the Ag content in the solution on the content of the deposit.

| Ag content in the solution | Zn (wt-%) | Ag (wt-%) | Ag/Zn |
| --- | --- | --- | --- |
| 1 ppb | 0.03 | 0.18 | 5.7 |
| 50 ppb | 0.04 | 1.10 | 29 |
| 500 ppb | 0.03 | 0.33 | 10 |
| 1000 ppb | 0.13 | 0.33 | 2.5 |

TABLE 1-continued

Effect of the Ag content in the solution on the content of the deposit.

| Ag content in the solution | Zn (wt-%) | Ag (wt-%) | Ag/Zn |
| --- | --- | --- | --- |
| 2 ppm | 0.15 | 0.53 | 3.4 |
| 5 ppm | 0.20 | 0.84 | 4.2 |
| 10 ppm | 0.07 | 4.94 | 71 |
| 100 ppm | 0.08 | 14.30 | 191 |
| 250 ppm | 0.06 | 38.67 | 685 |

Example 2. Recovery of Pt on 3D Carbon

In this example 3D carbon electrode was subjected to ED-RR in solution containing 60 g/L Ni, 20 ppm Pt, and 10 g/L $H_2SO_4$. The electrodeposition potential in step 1 was −0.6 V (vs. SCE) and the cut-off potential for the redox replacement (in step 2) was +0.4 V (vs. SCE). The used deposition time in step 1 was 10 s. The step 1 and step 2 were cycled 10 times.

Figure 2:
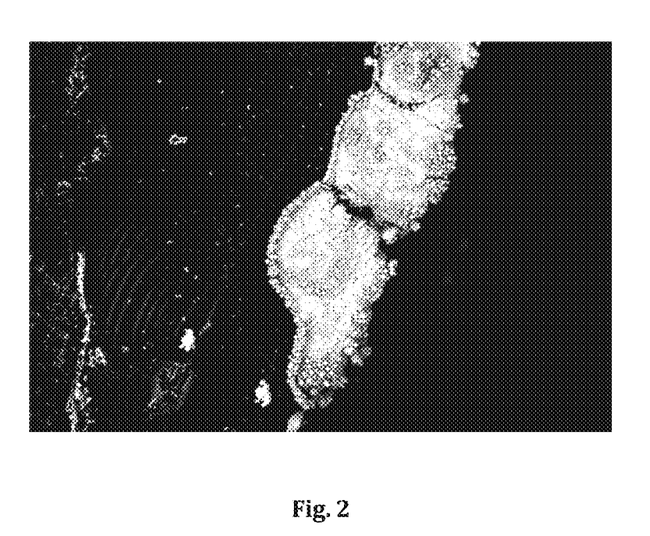
FIG. 2 is a SEM micrograph illustrating that Pt can be enriched on the surface of 3D carbon from solutions with low Pt concentration (20 ppm Pt) and high Ni concentration (60 g/L Ni).

FIG. 2 shows SEM micrograph of the deposited Pt/Ni on the surface of 3D carbon. The Pt/Ni ratio was determined by SEM-EDX and it was approx. 12 in average. The highest analyzed deposit fraction of Pt was 98 wt-% whereas the highest analyzed Ni was maximum 14.5 wt-%. This shows that using this method Pt can be recovered effectively on 3D-carbon electrode.

Example 3. Catalysing Effect of the Pt/Ni Deposits for $H_2$ Evolution

In this example 3D carbon electrode was subjected to ED-RR in solution containing 60 g/L Ni, 20 ppm Pt and 10 g/L $H_2SO_4$. The electrodeposition potential in step 1 was −0.6 V (vs. SCE) and the cut-off potential for the redox replacement (in step 2) was +0.4 V (vs. SCE). The used deposition times in step 1 were 10-60 s. The step 1 and step 2 were cycled 10 times. The Pt/Ni ratios of the deposit on the 3D-carbon electrode after ED-RR were determined by SEM-EDX and they were 71.7 (with 10 s deposition time in step 1), 33.6 (with 30 s deposition time in step 1) and 36.8 (with 60 s deposition time in step 1).

Figure 3:
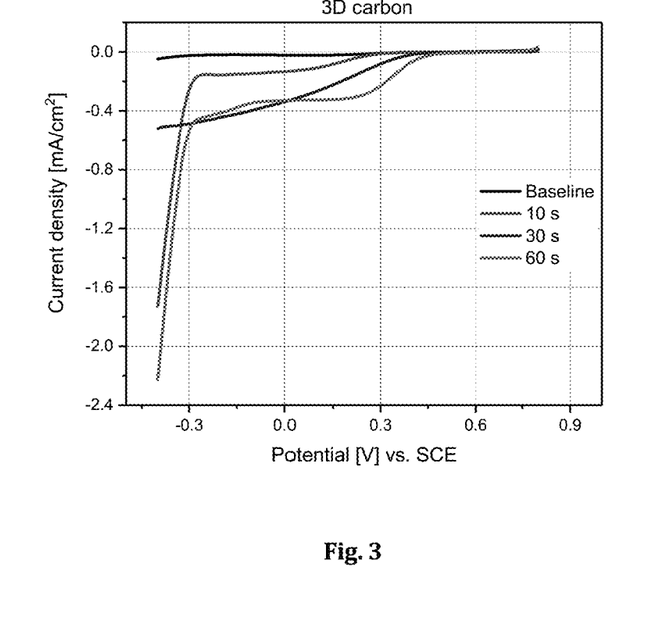
FIG. 3 illustrates that the deposit prepared by this method has a catalysing effect on $H_2$ evolution.

The catalyzing effects of the deposits were investigated in 0.1 M $H_2SO_4$ media, FIG. 3. Linear sweep voltammetry was measured from 0.8 V (vs. SCE) to the cathodic direction with scan rate of 20 mV/s.

The hydrogen evolution of 3D carbon without deposit started at −1.0 V (vs. SCE), while after using this method (ED-RR) the hydrogen evolution started at −0.3 V (vs. SCE). This shows that the Pt/Ni deposits prepared by this method on 3D carbon surface have a catalyzing effect on hydrogen evolution.

Example 4. Pt, Ag & Ni on 3D Carbon

Figure 4:
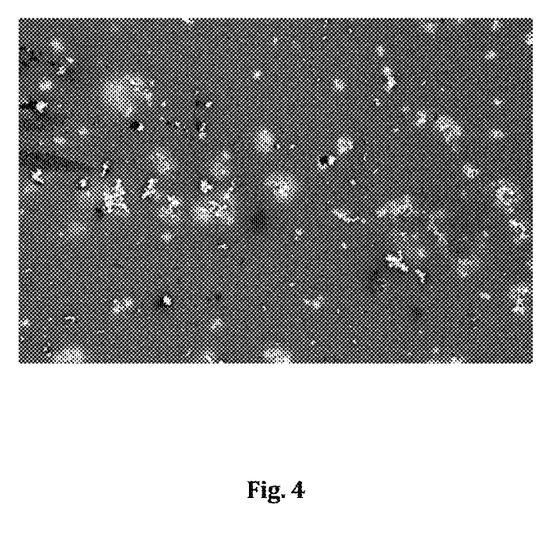
FIG. 4 is a SEM micrograph illustrating that both Ag and Pt can be recovered by this method on 3D carbon electrode from solution with low Ag and Pt concentration (20 ppm Pt, 10 ppm Ag) and high Ni concentration (60 g/L Ni).

In this example 3D carbon electrode was subjected to ED-RR in solution containing 60 g/L Ni, 20 ppm Pt, 10 ppm Ag and 10 g/L $H_2SO_4$. The electrodeposition potential in step 1 was −0.6 V (vs. SCE) and the cut-off potential for the redox replacement (in step 2) was +0.4 V (vs. SCE). The used deposition time in step 1 was 10 s. The step 1 and step 2 were cycled 20 times. FIG. 4 shows SEM micrograph of the deposit on 3D carbon. Table 2 shows that Ag and Pt can be recovered on 3D carbon electrode with this method.

TABLE 2

| C (wt-%) | Ni (wt-%) | Ag (wt-%) | Pt (wt-%) |
|---|---|---|---|
| 75.08 | 0.88 | 0.96 | 23.08 |

Content of the deposit on 3 D carbon.

Example 5. Recovery of Pt, Ag and Pd from Industrial Process Solution

Figure 5:
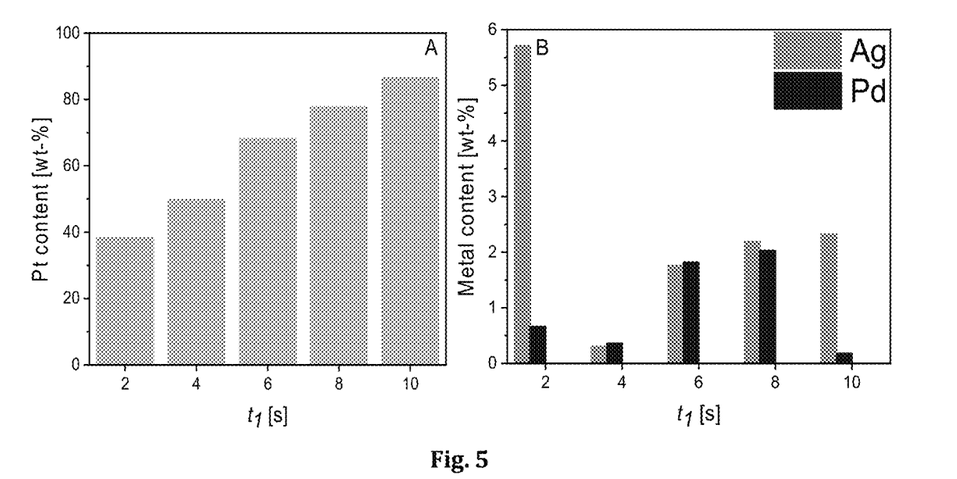
FIG. 5 illustrates weight-% of (A) Pt and (B) Ag and Pd on the 3D carbon electrode (analysed by SEM-EDX) as a function of deposition time during the electrodeposition step on ED-RR.

Table 3 shows the solution composition (real industrial sulfate based process solution) and FIG. 5 shows the recovered metal composition from this solution using ED-RR (weight-% of recovered Pt, Ag and Pd on the electrode deposit, analysed by SEM-EDX). Electrodeposition potential used was −175 mV vs. SCE and cut-off potential for the redox replacement step was +350 mV vs. SCE. Number of cycles was 10.

It can be seen that the Pt, Ag and Pd can be successfully enriched/recovered by ED-RR from industrial sulfate based solutions on the electrode surface. It is notable, that although the industrial sulfate based solution contains Pt even below the detection limit, it is still the dominating element of the metal deposit recovered successfully (FIG. 5A). Importantly, also Ag and Pd can be enriched on the electrode, although they are present in industrial solution at very small concentrations (FIG. 5B).

TABLE 3

Solution composition.

| Element | Al | As | Cu | Fe | Ni | Pb | Zn |
|---|---|---|---|---|---|---|---|
| Content in the solution | ppm 24.8 | ppm 767 | ppm 5850 | ppm 15900 | ppm 141000 | ppm 40 | ppm 236 |

| Element | Sn | Ga | Ge | In | Cd | Ag | Au | Pd | Pt |
|---|---|---|---|---|---|---|---|---|---|
| Content in the solution | ppb 227.5 | ppb 147.5 | ppb 2864 | ppb 999.7 | ppb 203.5 | ppb 5.9 | ppb <LOD | ppb 88.6 | ppb <LOD(1.0*) |

LOD = Limit of detection,
*value below detection limit

Abbreviations

EDRR electrodeposition-redox replacement
WE working electrode
CE counter electrode
RE reference electrode
SCE saturated calomel electrode
LOD limit of detection
3D three-dimensional

CITATION LIST

Non-Patent Literature

S. R. Brankovic, J. X. Wang, R. R. Adžić, "Metal monolayer deposition by replacement of metal adlayers on electrode surfaces" Surface Science, 474 (2001), p. L173.
Nikolay Dimitrov, Recent Advances in the Growth of Metals, Alloys, and Multilayers by Surface Limited Redox Replacement (SLRR) Based Approaches, Electrochimica Acta 209 (2016) 599-622.
Robert E. Rettew James W. Guthrie, Cherno Jaye, Daniel Fischer, Faisal M. Alamgir, Synthesis and Characterization of Monolayer Bimetallic Surfaces: A Synchrotron NEXAFS and XPS Study, ECS Transactions 19 (2009) 97-106.
R. E. Rettew, J. W. Guthrie, F. M. Alamgir, Journal of the Electrochemical Society 156 (2009) D513.
Wouter Maijenburg, Antony George, D. Samal, Maarten Nijland, Rogier Besselink, Bouwe Kuiper, Josée E. Kleibeuker, Johan E. ten Elshof, Electrodeposition of micropatterned Ni|Pt multilayers and segmented Ni|Pt|Ni nanowires, Electrochimica Acta 81 (2012) 123-128.
S. Papadimitriou, S. Armyanov, E. Valova, A. Hubin, O. Steenhaut, E. Pavlidou, G. Kokkinidis, S. Sotiropoulos, Journal of Physical Chemistry C 114 (2010) 5217.
S. Papadimitriou, A. Tegou, E. Pavlidou, S. Armyanov, E. Valova, G. Kokkinidis, S. Sotiropoulos, Electrochimica Acta 53 (2008) 6559.
A. Tegou, S. Armyanov, E. Valova, O. Steenhaut, A. Hubin, G. Kokkinidis, S. Sotiropoulos, Journal of Electroanalytical Chemistry 634 (2009) 104.
A. Tegou, S. Papadimitriou, G. Kokkinidis, S. Sotiropoulos, Journal of Solid State Electrochemistry 14 (2010) 175.

The invention claimed is:

1. A method of recovering a replacement metal from a sulfate-based process solution comprising:
   (a) electrodepositing a sacrificial metal on an electrode by applying a potential or current to the electrode, wherein the potential or current comprises an external potential or current or an external pulse potential or pulse current, and wherein the electrode is placed in a sulfate-based process solution comprising a replacement metal and the sacrificial metal;
   (b) conducting a redox replacement of the sacrificial metal by the replacement metal by cutting off or reducing the applied potential or current, wherein the replacement metal present in the sulfate-based process solution spontaneously replaces the sacrificial metal deposited in step (a), resulting in enrichment of the replacement metal on the electrode, and wherein the replacement metal is Pt or Ag or Pt and Ag;
   c) optionally repeating steps (a) and (b) subsequently or by a multistep pattern; and
   d) recovering the replacement metal from the electrode or using the deposition containing electrode as such.

2. The method according to claim 1, wherein the sacrificial metal comprises Ni and/or Zn.

3. The method according to claim 1, wherein sulfate-based process solution further comprises an additional element.

4. The method according to claim 1, wherein Pd is recovered on the electrode from the sulfate-based process solution.

5. The method according to claim 1, wherein the recovering takes place in sulfate-based solution, wherein the content of the replacement metal is <25 ppm.

6. The method according to claim 1, wherein a concentration of the replacement metal is below a detection limit in the sulfate-based process solution.

7. The method according to claim 1, wherein the sulfate-based solution has a sacrificial metal concentration >2 g/l.

8. The method according to claim 1, wherein the sulfate-based process solution originates from a hydrometallurgical process, a leaching process for ores or concentrates, an electrowinning or electrorefining process, a solution purification process, a slime treatment process or a side-stream treatment process, and wherein a sulfate content of the sulfate-based process solution is greater than 0.1 M.

9. The method according to claim 1, wherein the electrode comprises a conductive or semi-conductive material onto which the sacrificial metal can be deposited.

10. The method according to claim 1, wherein the electrode comprises a three dimensional (3D) carbon material fabricated through pyrolysis of polymers.

11. The method according to claim 1, wherein the electrodeposition step is conducted at a constant current or constant potential, by pulsing the current, pulsing the potential, or by varying the potential or current in a range in which the sacrificial metal deposits on the electrode.

12. The method according to claim 1, wherein the potential or current in the electrodeposition step is such that sacrificial metal deposits on the electrode and hydrogen evolution does not prevent the metal recovery, and wherein a cathodic potential in the electrodeposition step is less than 0 V vs. SCE (saturated calomel electrode).

13. The method according to claim 1, wherein an absolute value of a current density of the applied current density in the electrodeposition is in the range of 0.01-1000 mA/cm$^2$.

14. The method according to claim 1, wherein in the electrodeposition step (a) has a residence time in the range of 0.01 s-30 s.

15. The method according to claim 1, wherein the redox replacement step (b) is finished after a pre-determined time or when the open circuit potential value reaches a pre-determined value, which is below 0.6 V vs. SCE, however at a potential higher than a deposition potential of the sacrificial metal.

16. The method according to claim 1, wherein redox replacement step (b) can be conducted by cutting-off the applied potential or current or reducing the current to such a low value or potential close to open circuit potential that the spontaneous replacement of the sacrificial metal by the replacement metal can take place.

17. The method according to claim 1, wherein the redox replacement step (b) is finished after a pre-determined time period that allows replacement of the sacrificial metal with the replacement metal after less than 48 hours.

18. The method according to claim 1, wherein electrodeposition and redox replacement steps in claim 1, are repeated 1-1000 times before recovering the replacement metal from the electrode.

19. The method according to claim 1, wherein the electrode is subjected to leaching, a hydrometallurgical method, a pyrometallurgical method, chemical stripping, physical stripping or electrochemical stripping to recover the replacement metal from the electrode.

20. The method according to claim 1, wherein the sulfate-based process solution has a concentration ratio between the sacrificial metal and the replacement metal of >100.

21. The method according to claim 1, wherein the sulfate-based process solution is derived from a hydrometallurgical process.

* * * * *